(No Model.)
P. H. WHITING.
VEHICLE SPRING.
No. 385,334. Patented June 26, 1888.
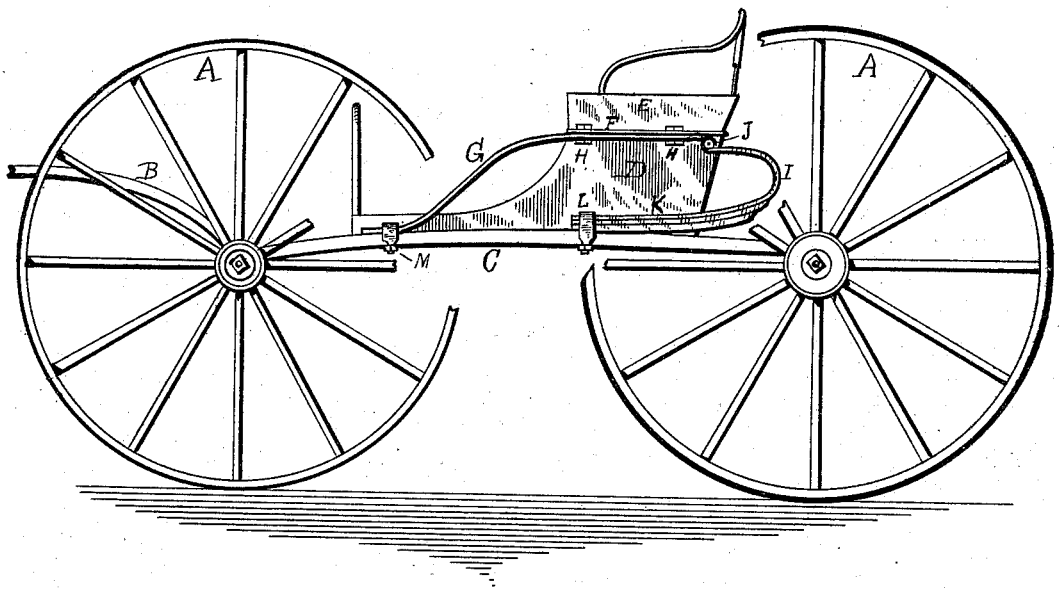
Attest
C. W. H. Brown,
H. Malmberg.
Inventor:
Preston H. Whiting
by J. W. Suggett
his atty.

UNITED STATES PATENT OFFICE.

PRESTON H. WHITING, OF CORTLAND, NEW YORK, ASSIGNOR OF ONE-HALF TO HJALMAR MALMBERG, OF SAME PLACE.

VEHICLE-SPRING.

SPECIFICATION forming part of Letters Patent No. 385,334, dated June 26, 1888.

Application filed September 19, 1887. Serial No. 250,036. (No model.)

*To all whom it may concern:*

Be it known that I, PRESTON H. WHITING, a citizen of the United States, residing at the village of Cortland, in the county of Cortland and State of New York, have invented certain new and useful Improvements in Vehicle-Springs; and I do hereby declare the following to be a full, clear, and exact description of the invention, such as will enable others skilled in the art to which it appertains to make and use the same.

The object of my improvements is to provide a side spring for each side of a side-bar buggy, by which the body of the buggy will be suspended by the said springs, said springs projecting up from the said side bars, and being attached to the said body by being fastened on the side of the same at and under the ends of the seat-bottom; and my invention consists in the arrangement and form of the said springs and their application to a side-bar buggy or carriage.

In the accompanying drawing is shown a side view of one of my side-bar buggies, with a portion of the wheels removed, so as to show more clearly the arrangement, construction, and form of the said springs and their application to a side-bar vehicle.

In said drawing, A A represent the wheels of the buggy.

B represents the shafts or thills.

C represents one of the said side bars, the other being exactly similar.

D represents the buggy-body, of which E is the seat.

F represents the part of the seat bottom or frame, usually made of wood, which projects out a little over the sides of the body thereunder.

G represents the front portion of the spring, which is securely clipped and fastened to the said side bar, C, near the forward end of the same, and which spring G gradually curves upward and backward for a short distance, as represented, and then runs about horizontally, and is securely bolted or fastened to the projecting edge F by the bolts shown at H H, the rear end of the said spring G being shackled or pivoted to the rear spring (shown at I) by the joint shown at J. The rear spring, I, is made C-shaped and is strengthened by two or more leaves, (shown at K.) Said rear spring, I, is securely fastened to the side bar, C, by bolts and by the clip shown at L. The form, construction, and arrangement of the other side of the buggy (not shown in the drawing) are exactly similar, it being only necessary, to completely understand the invention, to show only one side of the vehicle.

The springs G and I, I usually make of steel. It will be seen that the entire body (including the seat) is substantially supported by and suspended from the said springs G and I; but the forward end of the said body can be fastened to the said side bars by straps fastened to said side bars near the clip M. The said buggy has the usual turning-gear in front. In this form of springs described and shown the action of the same is harmonious and not antagonistic—that is, the front spring, G, and the rear spring, I, act conjointly and not against each other—thus producing a very pleasant and easy riding buggy.

The springs G and I, by being brought together at the top by the joint J, produce greater strength and prevent strains on the edge F or the body D, which would be caused if they were not so fastened by said joint to one another, and the joint J allows the necessary play or motion for the action of the said springs when the buggy is loaded and is driven at a high rate of speed over rough roads.

Having thus described my invention, what I claim as new, and desire to secure by Letters Patent, is—

1. In a side-bar vehicle, the combination, with the side bars and body, of the springs composed of two parts, G I, the forward end of G being secured to the forward end of the side bar and its rear end shackled to the forward end of the spring I, the lower end of spring I being secured to the side bar at a suitable distance to the rear of the secured end of part G, the body being suspended between the springs and secured thereto, substantially as specified.

2. The combination, in a side-bar vehicle, of the body and side bars thereof, the springs composed of two parts, G I, the part I secured to the side bar at a suitable distance from the rear end of said bar, said part extending rearward, curving upward and over upon itself, and shackled to the part G, which is secured to the side of the body and curves downward, having its forward end secured to the side bar, substantially as set forth.

PRESTON H. WHITING.

Witnesses:
 JOHN W. SUGGETT,
 HJ. MALMBERG.